United States Patent
Shi et al.

(10) Patent No.: US 8,274,801 B2
(45) Date of Patent: Sep. 25, 2012

(54) SWITCHING MODE POWER SUPPLY WITH BURST MODE AND ASSOCIATED METHODS OF CONTROL

(75) Inventors: Yang Shi, Hangzhou (CN); Junming Zhang, Hangzhou (CN); Yuancheng Ren, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 144 days.

(21) Appl. No.: 12/873,072

(22) Filed: Aug. 31, 2010

(65) Prior Publication Data

US 2011/0084677 A1 Apr. 14, 2011

(30) Foreign Application Priority Data

Sep. 1, 2009 (CN) .......................... 2009 1 0306434

(51) Int. Cl.
*H02M 3/335* (2006.01)
*H02M 3/338* (2006.01)

(52) U.S. Cl. ................ 363/21.03; 363/21.17; 363/21.18

(58) Field of Classification Search ................... 323/224, 323/266, 268, 271, 283–285, 287, 351; 363/18–21.07, 21.09–21.15, 21.17, 21.18, 363/56.1, 56.11, 95, 97
See application file for complete search history.

(56) References Cited

U.S. PATENT DOCUMENTS

| | | | |
|---|---|---|---|
| 6,480,401 B2 * | 11/2002 | Tang .......................... | 363/21.02 |
| 7,471,530 B2 * | 12/2008 | Balakrishnan et al. ......... | 363/95 |
| 2008/0130324 A1 * | 6/2008 | Choi et al. .................. | 363/21.03 |
| 2008/0310191 A1 * | 12/2008 | Zhu et al. .................... | 363/21.04 |
| 2008/0310194 A1 * | 12/2008 | Huang et al. ................ | 363/21.18 |
| 2010/0219802 A1 * | 9/2010 | Lin et al. ....................... | 323/284 |
| 2010/0225293 A1 * | 9/2010 | Wang et al. ................... | 323/290 |

* cited by examiner

*Primary Examiner* — Jue Zhang
*Assistant Examiner* — Nusrat Quddus
(74) *Attorney, Agent, or Firm* — Perkins Coie LLP

(57) ABSTRACT

Switching mode power supplies (SMPS) that can operate in a control mode for a normal load condition and operate with a burst-mode controller for a light load condition are disclosed herein. In one embodiment, a method for controlling the switching mode power supply includes when the load is in a light load condition, the switching mode power supply is controlled by a burst-mode controller.

30 Claims, 8 Drawing Sheets

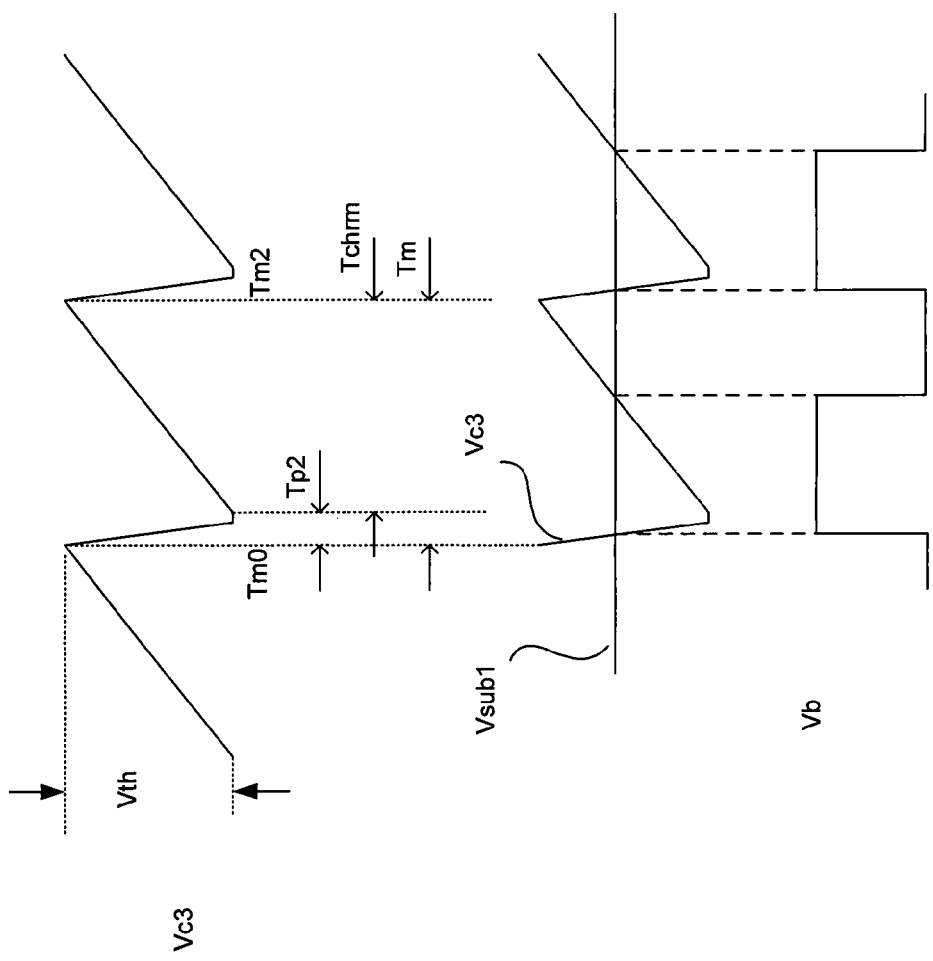

SWITCHING MODE POWER SUPPLY WITH BURST MODE AND ASSOCIATED METHODS OF CONTROL

CROSS-REFERENCE TO RELATED APPLICATION

The present application claims priority from Chinese Application No. 200910306434.3, filed Sep. 1, 2009, the disclosure of which is incorporated herein by reference in its entirety.

TECHNICAL FIELD

The present technology generally relates to a switching mode power supply with a burst-mode function, and to a control circuit that implements the burst-mode function.

BACKGROUND

Nowadays, switch mode power supply ("SMPS") is becoming widely used for electronic devices. The semiconductor switch in the SMPS is turned on and turned off periodically to supply energy to a load with switching frequency generally over ten KHz. SMPS can be smaller, lighter and more efficient compared to a conventional linear power supply.

There are many circuit topologies for SMPS, such as buck, boost for the non-isolated type and half-bridge, flyback for the isolated type. Taking a SMPS based on flyback topology as an example, it has the following functional modules: an energy input module, an energy couple module, an energy output module, a feedback module and a controlling module. An alternative current ("AC") voltage is input through the energy input module and transformed into a smooth direct current ("DC") voltage, which is further transformed into a high frequency signal through periodically turning on and turning off the switch based on a feedback signal. The high frequency signal is coupled by a transformer and a steady DC voltage is output through the output module.

Besides normal operating mode, electronic devices can also operate under a reduced load or standby mode (generally referred to as "light load"). Under light load conditions, the load needs very low power output from the power supply. If the controlling module still uses the original frequency to drive the switch, the loss on the switch becomes significant and the efficiency becomes low. One solution is decreasing the frequency to a lower level. However, from an efficiency point of view, the light load condition requires switch frequencies below 20 KHz. Thus, the frequency is in the audible frequency range to cause noise issues.

Another solution is adopting a burst-mode function, which alternately modulates the switch based on a high frequency signal within a period of time (labeled with Mon), and in another period of time (labeled with Moff) the switch is kept off. Thus, the equivalent switching frequency is decreased to reduce the switching loss. However, the period of time Mon and Moff is typically automatically adjusted according to the power supplied to the load, which may cause the value of Mon and Moff to be uncertain, resulting in noise issues.

BRIEF DESCRIPTION OF THE DRAWINGS

FIG. 5B shows voltage waveforms of a power supply under a light load condition.

DETAILED DESCRIPTION

The present disclosure describes switch mode power supplies and associated methods of control. It will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the invention. Additionally, the invention can include other embodiments that are within the scope of the claims but are not described in detail with respect to FIGS. 1-7.

Figure 1:
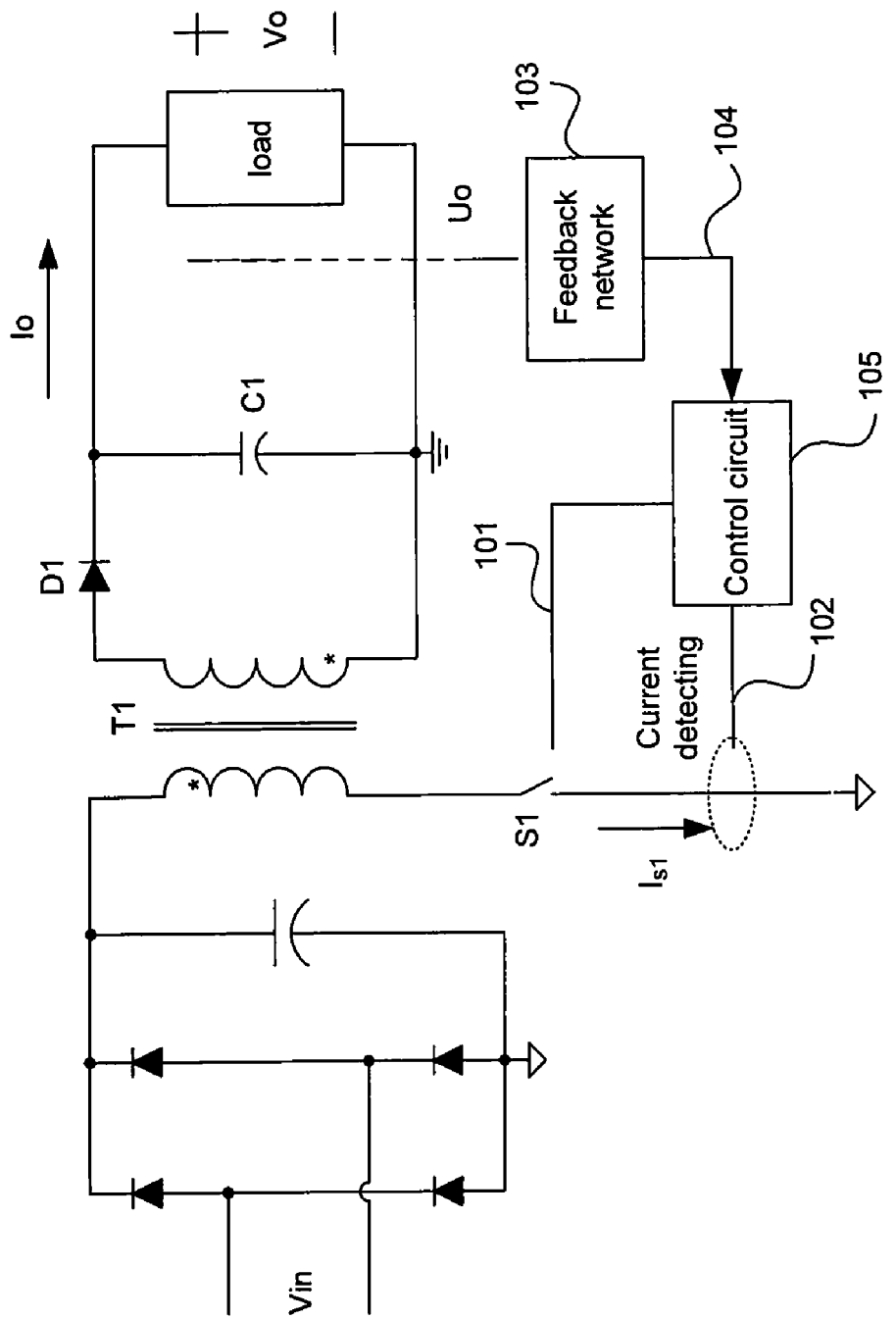
FIG. 1 is a schematic circuit diagram of a power supply based on flyback topology according to several embodiments of the technology.

FIG. 1 is a schematic circuit diagram of a power supply based on flyback topology according to several embodiments of the technology. It should be noted that several embodiments of the control method are also applicable to other topologies such as buck, boost for the non-isolated type and half-bridge, flyback for the isolated type, and/or other types of power supply.

In the illustrated embodiment, an input voltage Vin is regulated to supply power to a load. The input voltage Vin is coupled to the primary side of a transformer T1, and further coupled to the secondary side of the transformer T1 by periodically turning on and turning off a switch S1. The switch S1 is controlled by a signal 101. The voltage on the secondary side of the transformer T1 is rectified by a diode D1 and further filtered by a capacitor C1 to generate a constant signal Uo, which can be a voltage signal Vo or a current signal Io.

A control circuit module 105 has one input that is a switch current detecting signal 102, and another input that is a feedback signal 104. The current Is1 flowing through the switch S1 may be detected, for example, through detecting the voltage across a resistor and/or other suitable techniques. The feedback network 103 samples the constant signal Uo and outputs the feedback signal 104. The control circuit module 105 is responsive to the feedback signal 104 and the switch current detecting signal 102, outputting a signal 101 to turn on and turn off the switch S1. The control circuit module 105 can be made on an integrated circuit, on discrete components, or a combination of IC and some discrete components. The feedback signal 104 can be any type of signal which can reflect the status of a load, such as a voltage signal, a current signal, or a power signal. In one embodiment, the switch S1 is a MOSFET, Uo is a voltage signal Vo and the feedback signal 104 is a voltage signal. In other embodiments, the switch S1 can also include a JFET, a diode, and/or other suitable types of switching devices.

The switch of a SMPS may be driven based on a conventional pulse width modulation ("PWM") control mode with fixed frequency pulse, which can be voltage mode or current mode, or a fixed on-time variable off-time control mode, or a quasi-resonant control mode. The pulse frequency for driving the switch is variable for the fixed on-time variable off-time control mode and the quasi-resonant control mode. For the PWM control mode, the output is regulated through controlling the time during which the switch is on (on time). For the fixed on-time variable off-time control mode, the on-time of the switch is constant, while the time during which the switch is off (off time) is controlled. For the quasi-resonant control mode, the on-time of the switch is controlled as that for the PWM control mode, and the switch is turned on when the voltage across the switch decreases to a minimum value.

Figure 2:
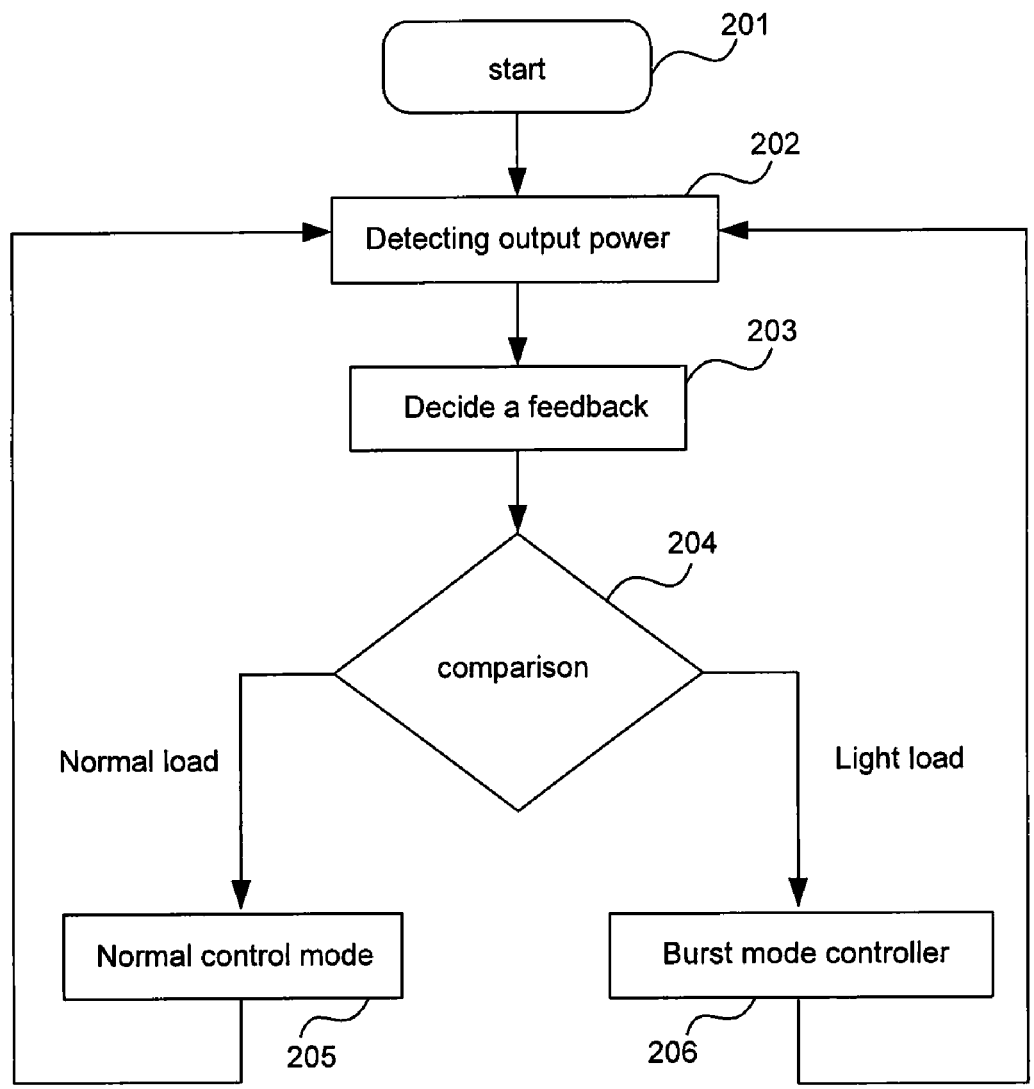
FIG. 2 is a flow chart of a method of control according to the technology.

FIG. 2 is a flow chart of a method of control according to the technology. In stage 202, the output power of a SMPS is detected. Then, a feedback signal based on the value of the output power is generated in stage 203. For a PWM control mode or a quasi-resonant control mode, the value of the feedback signal determines the value of on-time of the switch; for a fixed on-time variable off-time control mode, the value of the feedback signal determines the value of the driving signal frequency for the switch. In stage 204, the feedback signal is compared with a threshold signal. For a PWM control mode or a quasi-resonant control mode, the value of the threshold signal is related to the on-time of the switch. In one embodiment, the value of the threshold signal is set to be a value that the on-time of the switch, corresponding to the threshold signal, is 25% of the on-time value for the full load. For a fixed on-time variable off-time control mode, the value of the threshold signal is related to the value of the driving signal frequency for the switch. In one embodiment, the value of the threshold signal is set to be such a value that the frequency value, corresponding to the threshold signal, is 20% of the frequency value for the full load. In other embodiments, the threshold signal may have other suitable values.

If the comparison result in stage 204 indicates that the output power is higher than the threshold power, the process proceeds to stage 205, in which the SMPS operates under a normal load condition with a conventional PWM control mode, a quasi-resonant control mode, or a fixed on-time variable off-time control mode. If the comparison result in stage 204 indicates that the output power is lower than the threshold power, the process proceeds to stage 206, in which the SMPS operates under a light load condition with a burst-mode controller.

Figure 3:
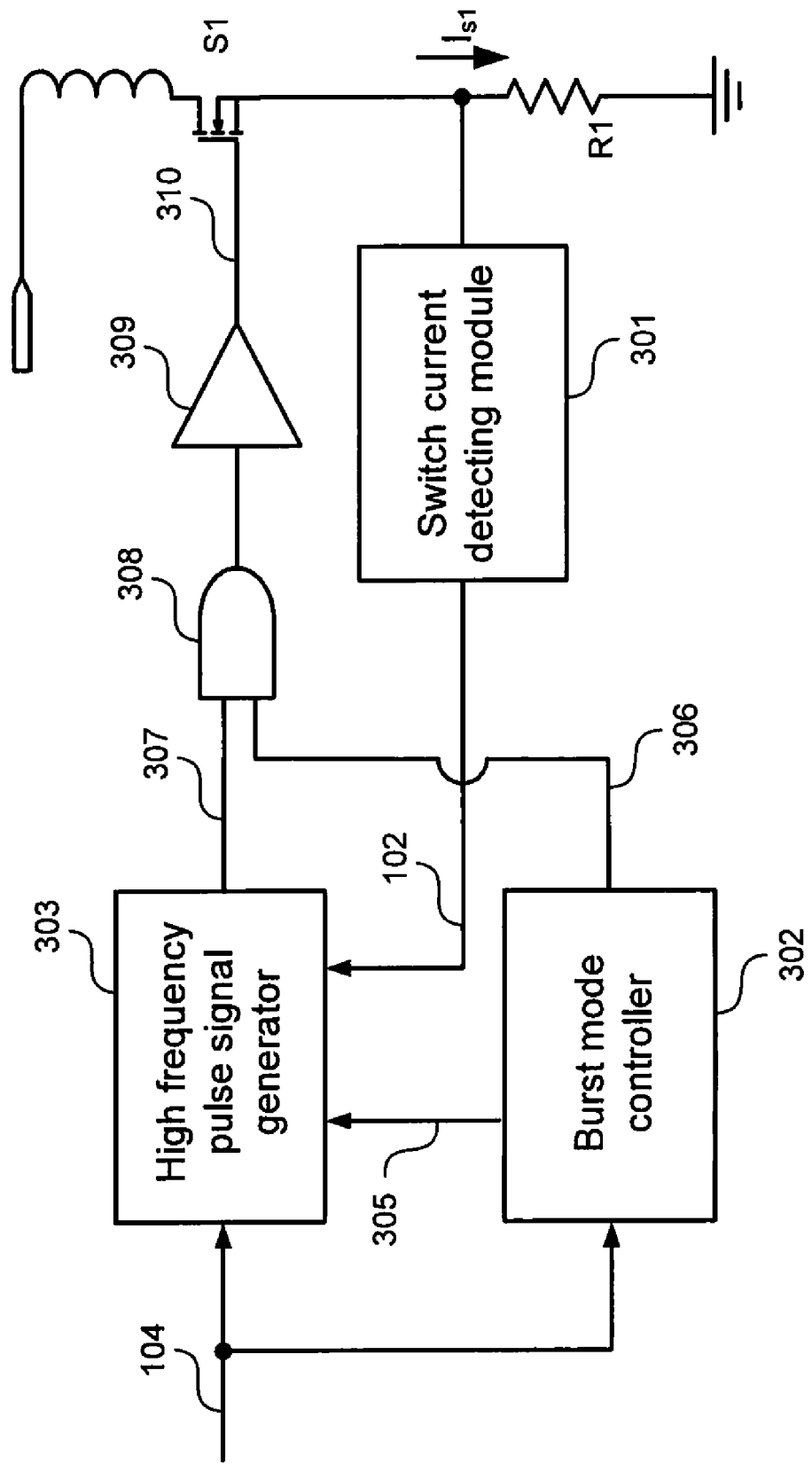
FIG. 3 is a schematic block diagram of a power supply according to several embodiments of the technology.

FIG. 3 is a schematic block diagram of a power supply according to several embodiments of the technology. The illustrated embodiment is based on a flyback topology with a fixed on-time variable off-time control mode though other topologies may also be used. When the SMPS operates under a normal load condition, the burst-mode controller 302 is inactive. A high frequency pulse signal generator 303 receives a feedback signal 104 and a switch current detecting signal 102, and outputs a signal to control the switching of the switch S1 with a fixed on-time variable off-time control mode. When the SMPS operates under a light load condition, the burst-mode controller 302 becomes active. The burst-mode controller 302 outputs a signal 305 to control the frequency of the output signal 307 from the high frequency pulse signal generator 303. The burst-mode controller 302 also outputs a low frequency modulation signal 306 to modulate the signal 307 via the AND gate 308. In one embodiment, the value of the current Is1 is detected through detecting the voltage across a resistor R1. In other embodiments, the value of the current Is1 may be detected through other suitable techniques.

Figure 4:
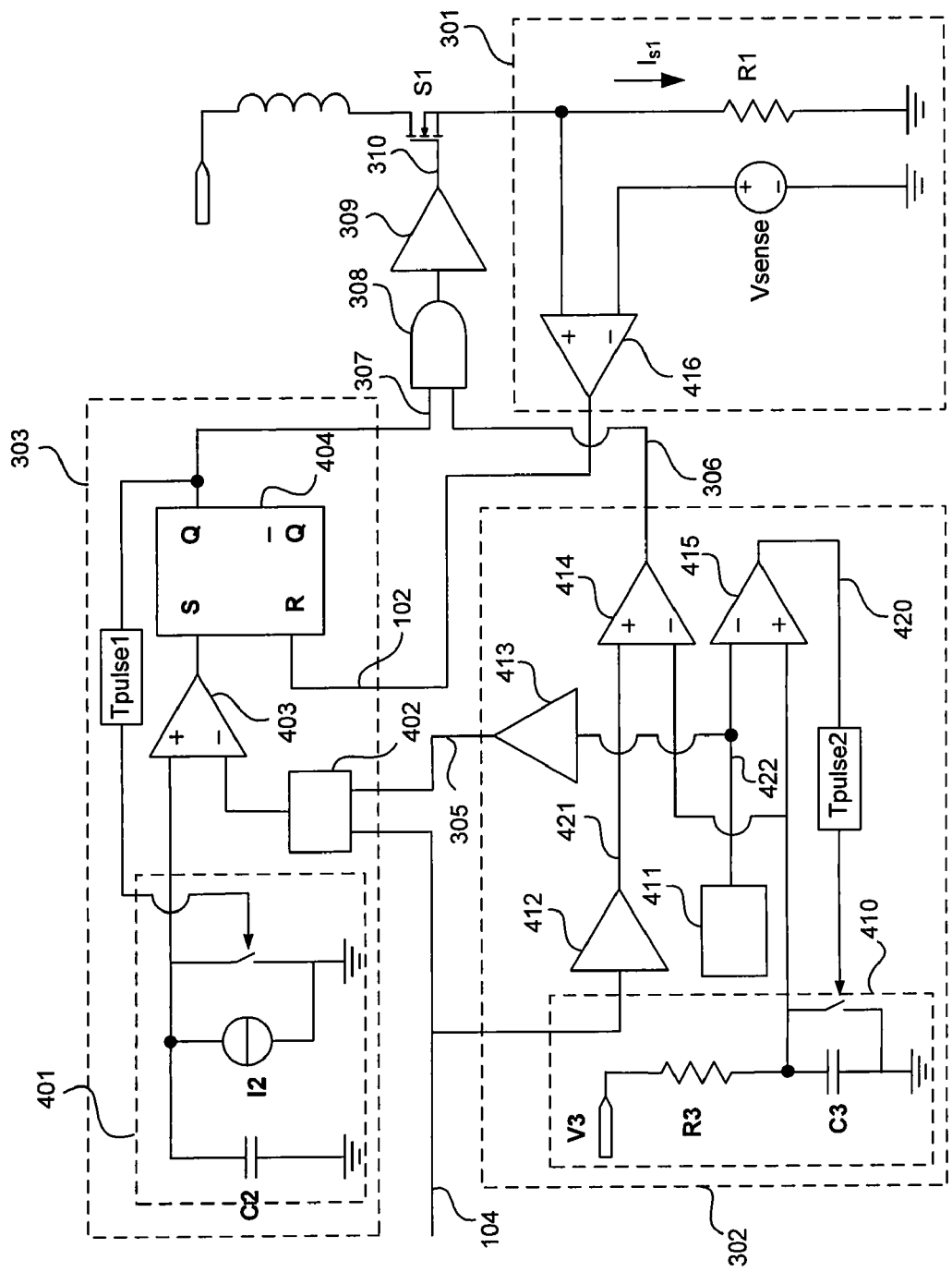
FIG. 4 is a detailed schematic diagram for the power supply in FIG. 3.

FIG. 4 is a detailed schematic diagram for the power supply in the FIG. 3. As shown in FIG. 4, the high frequency pulse signal generator 303 comprises: a frequency setting module 401 for the high frequency pulse signal, a circuit selecting module 402, a third comparator 403, and a flip-flop 404. The module 401 is used to set the frequency of the signal 307, which is the output signal of the module 303. The frequency setting of the signal 307 can be realized by adjusting the value of a capacitor C2 and/or the value of a current source I2. The circuit selecting module 402 compares input signals, selecting one of them as an output signal based on the comparison result. For a normal load condition, the feedback signal 104 is selected as an output; for a light load condition, the signal 305 is selected as an output. The output terminal of the module 402 is connected to the inverting input of the comparator 403, the non-inverting input of the comparator 403 receives the output from the module 401. The flip-flop 404, with its SET terminal connected to the output terminal of the comparator 403, and its RESET terminal receiving the signal 102, outputs the signal 307. The signal 307 is coupled to the module 401 through a module Tpulse1 to discharge the capacitor C2. The signal 307 is also received by one terminal of a logic ADD gate 308, the other terminal of the ADD gate 308 receives the modulation signal 306, the output terminal of the ADD gate 308 is coupled to control the switching of switch S1.

The burst-mode controller 302 comprises: a modulation signal frequency setting module 410, a threshold setting module 411, a first subtracter 412, a second subtracter 413, a first comparator 414 and a second comparator 415. The module 410 is used to set the frequency of the modulation signal 306, which can be realized by adjusting the value of the voltage source V3 and/or the value of the capacitor C3 and/or the value of the resistor R3. The threshold setting module 411 outputs a signal 422, whose value determines the output power level when the SMPS transits from a normal load condition to a light load condition. The signal 422 is coupled to the input terminal of the second subtracter 413, and also to the inverting terminal of the comparator 415.

In one embodiment, the signal 422 is set to be a value such that when the output power decreases to a value that is 20% of the output power value at a full load, the SMPS transmits into a light load condition. The first subtracter 412 receives the feedback signal 104 as an input signal, and outputs a signal 421; the output terminal of the subtracter 412 is connected to the non-inverting terminal of the comparator 414. Vfb stands for the value of the feedback signal 104, Vref is a predetermined value, the function of the subtracter 412 can be described as Vsub1=Vref−Vfb (Vsub1 stands for the value of the output signal 421). The function of the subtracter 413 can be described as Vsub2=Vref−Vth, in which Vth stands for the value of the signal 422 and Vsub2 is the value of the signal 305. The non-inverting terminal of the comparator 414 is connected to the output terminal of the subtracter 412, the inverting terminal of the comparator 414 is connected to the output of the module 410, the output terminal of the comparator 414 is connected to the input terminal of the ADD gate 308, and the other input signal of the ADD gate 308 is the output signal 307 from the module 303. The non-inverting terminal of the comparator 415 is connected to the output signal of the module 410, the inverting terminal of the comparator 415 is connected to the output terminal of the module 411, and the output signal 420 of the comparator 415 is coupled to the module Tpulse2 to discharge the capacitor C3. The output signal 423 of the module 410 is a saw-tooth waveform, whose frequency is the same as that of the modulation signal 306.

Figure 5A:
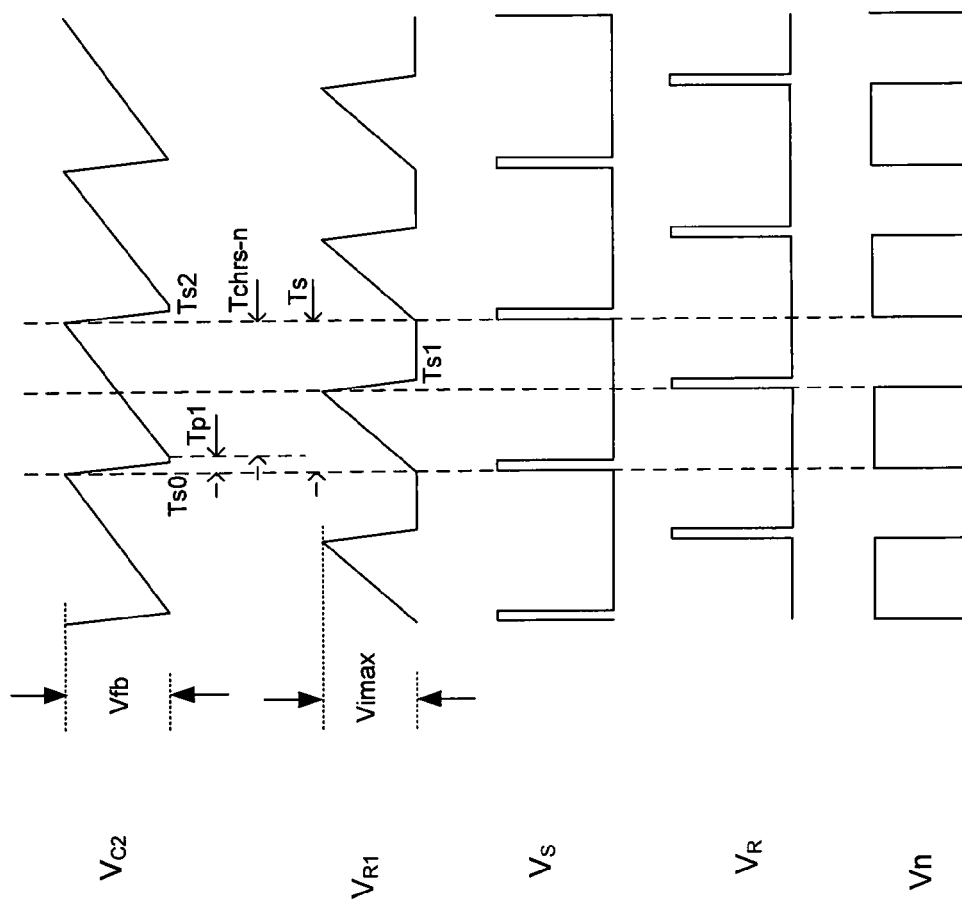
FIG. 5A shows voltage waveforms of a power supply under a normal load condition.

FIG. 5A shows voltage waveforms of a power supply under a normal load condition, and FIG. 5B shows voltage waveforms of a power supply under a light load condition. In one embodiment, the value of the feedback signal 104 (Vfb)

becomes bigger when the output power becomes lower. If Vfb is smaller than Vsub2, which is the value of the output signal 305 of the subtracter 413, the module 402 selects the feedback signal 104 as the input signal to the inverting terminal of the comparator 403, indicating a normal load condition. In FIG. 5A, Vc2 shows the voltage waveform across the capacitor C2; VR1 shows the voltage waveform across the resistor R1; VS shows the waveform of the input signal to the SET terminal of the flip-flop 404; VR shows the waveform of the input signal to the RESET terminal of the flip-flop 404; and Vn shows the waveform of the signal 307.

For a normal load condition, the switch driving signal 310 has a similar waveform as the signal 307. Taking the waveforms within a high frequency signal period (from Ts0 to Ts2) as an example, at the instant Ts0, the voltage across the capacitor C2 reaches Vfb, the output signal of the comparator 403 becomes high, which sets the flip-flop 404, the output voltage at the Q terminal becomes high. The switch S1 is closed, the current Is1 through the switch S1 increases and the voltage VR1 starts increasing. The Q terminal is coupled to the Tpulse1 module to generate a pulse signal with an interval of Tp1. The pulse signal is coupled to the module 401, discharging the voltage across the capacitor C2. After the interval Tp1, the capacitor C2 is charged again by a current source 12 until the beginning of the next period (at instant Ts2). From the instant Ts0 to the instant Ts1, the voltage VR1 increases continually. The voltage on the inverting terminal of the comparator 416 is Vimax, which is set by a voltage source Vsense. When VR1 reaches Vimax, the output of the comparator 416 becomes high, the flip-flop 404 is reset and the Q terminal becomes low. Switch S1 is opened and VR1 decreases to 0 volts. The switch S1 is kept opened until to the beginning of the next period. At the instant Ts2, Vc2 increases to Vfb again. Afterwards, the waveforms in FIG. 5A repeat as those from Ts0 to Ts2.

The period of Vc2 is Ts, and the period of Vn is also Ts. Ts comprises Tp1 and Tchrs-n, Tp1 is pre-determined by module Tpulse1, and Tchrs-n can be set by adjusting the value of the capacitor C2 and/or the value of the current source 12 and/or the value of the feedback signal 104. Cs stands for the value of the capacitor C2, Is stands for the value of the current source 12, and Tchrs-n can be described as $$T_{chrs-n} = \frac{C_s V_{fb}}{I_s}$$

Thus, Tchrs-n can be changed in accordance with the change of the feedback signal 104, or by adjusting the value of the capacitor C2, or by adjusting the value of the current source 12. Since Tchrs-n is part of the period Ts, the frequency of the signal 310 can be changed accordingly. Under a normal load condition, the value of the feedback signal 104 (Vfb) becomes bigger if the output power become less, which means Tchrs-n becomes bigger and the frequency of the signal 310 becomes lower.

When Vfb is smaller than Vsub2, i.e., Vfb<Vref−Vth, which is equivalent to Vref−Vfb>Vth, the voltage of the output signal 306 from the comparator 414 is high, and the burst mode controller 302 is inactive. When Vfb is bigger than Vsub2, which is the value of the output signal 305 of the subtracter 413, the module 402 selects the output signal 305 as the input signal to the inverting terminal of the comparator 403, indicating a light load condition. As shown in FIG. 5B, Vc3 shows the voltage waveform across the capacitor C3. Taking the waveforms within a modulation signal period (from Tm0 to Tm2) as an example, at the instant Tm0, the voltage across the capacitor C3 reaches to a value of Vth, and the output signal 420 of the comparator 415 becomes high. The signal 420 is coupled to the module Tpulse2 to generate a pulse signal with an interval of Tp2, and the pulse signal is coupled to the module 410 to discharge the capacitor C3. After the time of Tp2, the capacitor C3 is charged again until it reaches the instant Tm2, at that time the voltage of the capacitor C3 reaches Vth again. The waveform labeled with Vb shows the waveform of the modulation signal 306. Afterwards, the waveforms in FIG. 5B are repeated as those from Tm0 to Tm2.

The period of the waveform Vc3 is Tm, and the period of the modulation signal 306 is Tm. The period of Tm comprises Tp2 and Tchrm. In the embodiment, Tp2 is determined by the module Tpulse2, Tchrm can be set by adjusting the value of the voltage source V3, and/or by adjusting the value of the capacitor C3, and/or by adjusting the resistor R3, and/or by adjusting the value of the signal 422. Vm stands for the value of the voltage source V3, Cm stands for the value of the capacitor C3, Rm stands for the value of the resistor R3, and Tchrm can be described as $$T_{chrm} = -R_m C_m \ln \frac{V_m - V_{th}}{V_m}$$

Thus, Tchrm can be changed by adjusting the value of the voltage source V3, and/or by adjusting the value of the capacitor C3, and/or by adjusting the resistor R3, and/or by adjusting the value of Vth. Since Tchrm is part of the period Tm, the frequency of modulation signal 306 can be changed accordingly.

Under the light load condition, the circuit selecting module 402 selects the signal 305 as the input signal to the inverting input terminal of the comparator 403, the frequency of the signal 307 is not affected if load changes. Under the light load condition, the period of the signal 307 comprises Tp1 and Tchrs-b, where Tchrs-b is the time for the voltage across the capacitor C2 to increase from 0 volt to a value of Vref−Vth, and the function of Tchrs-b can be described as:

$$T_{chrs-b} = \frac{C_s(V_{ref} - V_{th})}{I_s}$$

Thus, Tchrs-b can be changed by adjusting the value of the signal 305, and/or by adjusting the value of the capacitor C2, and/or by adjusting the value of the current source 12. Accordingly, the period of the signal 307 can be changed.

For the light load condition, the relation can be expressed as Vfb<Vref−Vth, while for the normal load condition, the relation can be expressed as Vfb>Vref−Vth. With the change of Vfb, there exists a transition point when Vfb=Vref−Vth. At this point, Tchrs-n equals to Tchrs-b, indicating that the frequency of the output signal 307 from the high frequency pulse generator 303 does not undergo a sudden change.

Figure 6:
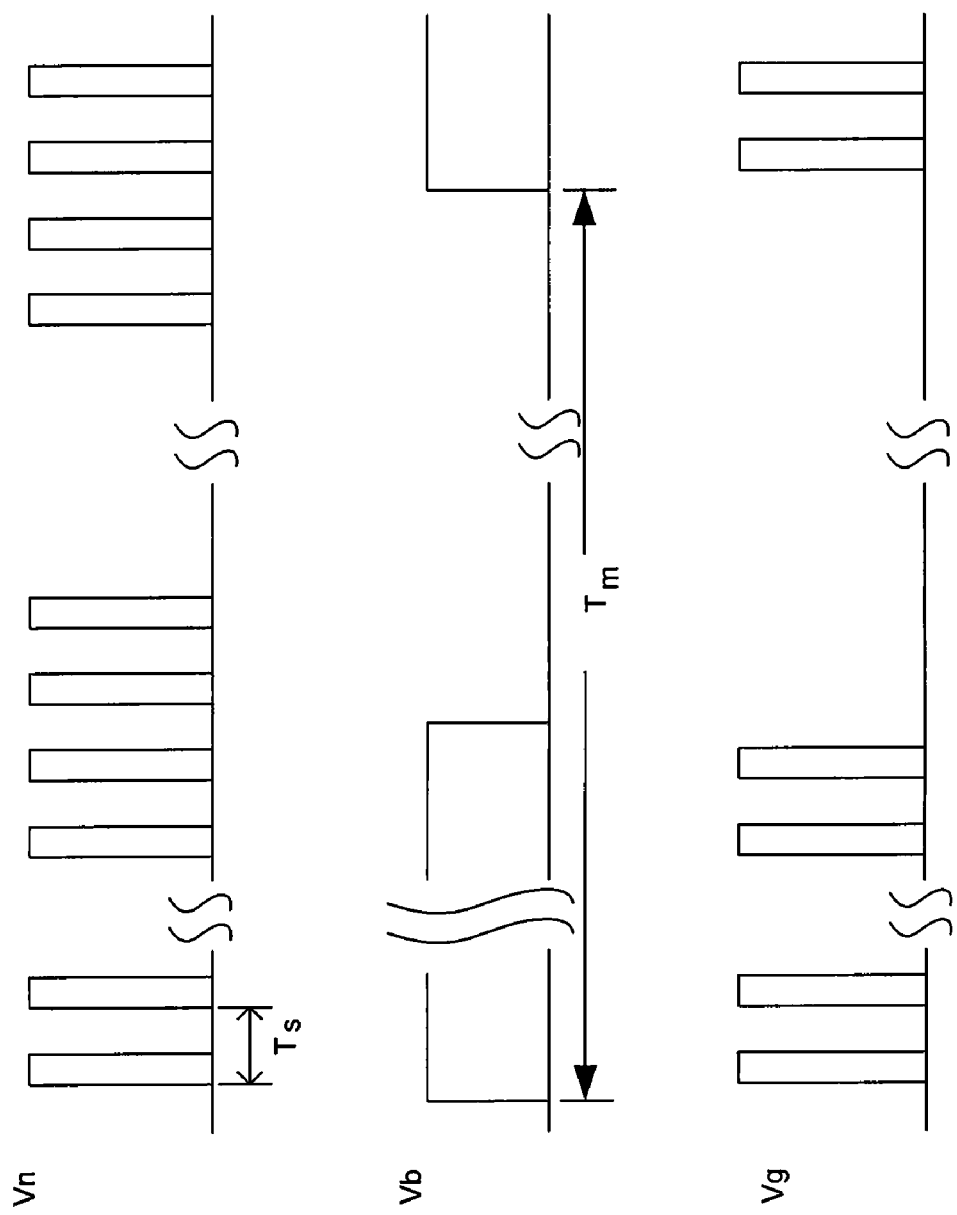
FIG. 6 shows voltage waveforms of the switch driving signal corresponding to the embodiment in FIG. 4 under a light load condition.

FIG. 6 shows voltage waveforms of the switch driving signal corresponding to the embodiment in FIG. 4 under a light load condition. The waveform labeled with Vn is the waveform of the signal 307 with a period of Ts, which is the output signal of the high frequency pulse signal generator 303. The waveform labeled with Vb is the waveform of the signal 306 with a period of Tm, which is the output signal of the burst mode controller 302. The signal 307 is modulated by the signal 306 through the ADD gate 308 to generate the driving signal 310. The waveform of signal 310 is shown by the waveform labeled with Vg. Within the period Tm, there are fewer high frequency pulses for the signal 310 than for the signal 307, which can significantly reduce the power loss caused by the switching of the switch. For reducing the noise caused by the switching of the switch, Ts and Tm can be set to be within a specific range during the light load condition as what is explained in the specification.

When the SMPS transitions into the light load condition, if the load becomes even lighter, the value of the feedback signal 104 (Vfb) becomes bigger, the value of the signal 421 (Vsub1) becomes smaller, so the duty cycle of the modulation signal 306 is decreased. In the interval of Tm, the number of the high frequency pulses becomes fewer to decrease the power supply to the load.

Figure 7:
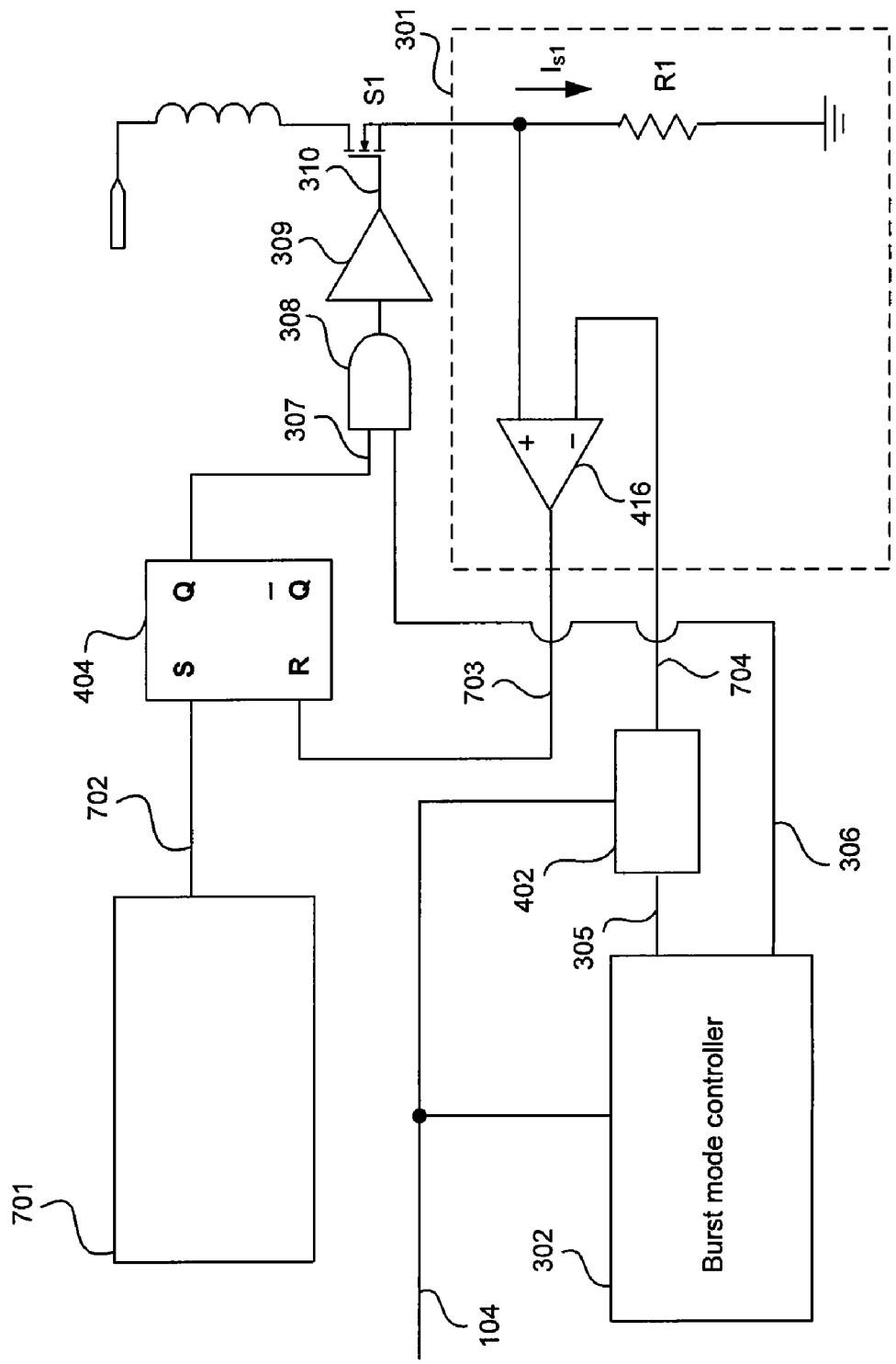
FIG. 7 is a block diagram of a power supply according to additional embodiments of the technology.

FIG. 7 is a block diagram of a power supply according to additional embodiments of the technology. The illustrated embodiment is based on a peak current PWM control mode or a quasi-resonant control mode. If a peak current PWM control mode is used, the module 701 is a clock signal generator. If a quasi-resonant control mode is used, the module 701 is a voltage valley detecting module. The output signal 702 from the module 701 is input to the SET terminal of the flip-flop 404, the circuit selecting module 402 selects one signal as an input to the inverting terminal of the comparator 416 from the feedback signal 104 and the output signal 305. The output signal 703 of the comparator 416 is input to the RESET terminal of the flip-flop 404. The on time of the switch S1 is determined by the value of the signal 704. For the embodiment with a peak current PWM control mode, the clock signal generator sets the flip-flop 404 after each clock period. For the embodiment with a quasi-resonant control mode, the flip-flop is set when it is detected by the voltage valley detecting module that the drain-source voltage across the switch S1 decreases to a minimum value. The clock signal generator and the voltage valley detector are common in the art, so further detailed description is not needed. For a normal load condition, the burst-mode controller 302 is inactive, the feedback signal 104 is selected by the circuit selecting module 402 to output the signal 704 to the switch current detecting module 301. The output signal 703 of the switch current detecting module 301 is used to control the on-time of the switch S1.

In one embodiment, the value of the feedback signal 104 becomes smaller if the output power decreases. When the output power decreases to a value below the threshold value, the SMPS enters into the light load condition, the burst mode controller 302 becomes active. An output signal 305 form the burst mode controller 302 is selected by the circuit selecting module 402 as an input to the module 301, which makes the on-time of the switch S1 to be a fixed value. Another output signal 306 from the burst mode controller 302 is coupled to one input of an ADD gate 308, and another input of the ADD gate 308 receives the output signal 307 from the flip-flop 404. The output of the flip-flop 404 is coupled to the driving circuit 309 to generate a switch driving signal 310 to turn on and turn off the switch S1. For the light load condition, if a PWM control mode is applied, the frequency of the high frequency pulse signal is set by the clock signal generator; if a quasi-resonant control mode is applied, the frequency range of the high frequency pulse signal can be set by setting the threshold value for the light load condition. The control function of the frequency and duty cycle of the low frequency modulation signal is the same as what is explained in the embodiment shown in the FIG. 4.

From the foregoing, it will be appreciated that specific embodiments of the disclosure have been described herein for purposes of illustration, but that various modifications may be made without deviating from the disclosure. For example, many of the members of one embodiment may be combined with other embodiments in addition to or in lieu of the members of the other embodiments. Accordingly, the disclosure is not limited except as by the appended claims.

We claim:
1. A switching mode power supply comprising:
a feedback network configured to provide a feedback signal based on a load condition;
a control circuit operatively coupled to the feedback network to receive the feedback signal,
wherein the control circuit compares the value of the feedback signal to a threshold value to indicate a light load condition or a normal load condition, the control circuit controls the switching mode power supply to operate in a burst mode for the light load condition, and wherein the control circuit comprises:
a current detecting circuit module configured to detect the current flowing through a switch to generate a current detecting signal;
a burst-mode controller coupled to the feedback network to receive the feedback signal, wherein based on the feedback signal, the burst-mode controller generates a low frequency modulation signal, and wherein the frequency of the low frequency modulation signal is fixed;
a high frequency pulse signal generator coupled to receive the feedback signal and the current detecting signal, wherein based on the feedback signal and the current detecting signal, the high frequency pulse signal generator generates a high frequency pulse signal; and
a modulation circuit coupled to the burst-mode controller and the high frequency pulse signal generator to receive the high frequency pulse signal and the low frequency modulation signal, wherein based on the high frequency pulse signal and the low frequency modulation signal, the modulation circuit generates a switch controlling signal to control the switch.

2. The switching mode power supply of claim 1 wherein under the light load condition, the frequency of the high frequency pulse signal is set to be within a predetermined range, and the duty cycle of the low frequency modulation signal is adjusted to control the power supplied to the load.

3. The switching mode power supply of claim 1 wherein the high frequency pulse signal is determined by a control the switch the high frequency pulse signal is determined by a control signal generated by the burst-mode controller and the current detecting signal under the light load condition, and the high frequency pulse signal is determined by the feedback signal and the current detecting signal under the normal load condition.

4. The switching mode power supply of claim 2 wherein when the switching mode power supply operates under the normal load condition, a pulse width modulation (PWM) control mode is used.

5. The switching mode power supply of claim 2 wherein when the switching mode power supply operates under the normal load condition, a quasi-resonant control mode is used.

6. The switching mode power supply of claim 2 wherein the switching mode power supply operates under the normal load condition, a fixed on-time variable off-time control mode is used.

7. The switching mode power supply of claim 6 wherein when the switching mode power supply operates under the normal load condition, the switching frequency of the switch decreases when the load becomes lighter, and wherein when the load transitions from the normal load condition to the light load condition, the switching frequency of the switch is substantially constant.

8. The switching mode power supply of claim 2 wherein the frequency of the low frequency modulation signal is lower than a lower limit of an excluded frequency range.

9. The switching mode power supply of claim 2 wherein the frequency of the high frequency pulse signal is higher than an upper limit of an excluded frequency range.

10. The switching mode power supply of claim 8 wherein the lower limit of the excluded frequency range is lower than or equal to a lower limit of an audible frequency range.

11. The switching mode power supply of claim 9 wherein the upper limit of the excluded frequency range is larger than or equal to an upper limit of an audible frequency range.

12. The switching mode power supply of claim 3 wherein the burst-mode controller comprises:
a frequency setting module for the low frequency modulation signal, with an output terminal coupled to a inverting terminal of a first comparator and coupled to a non-inverting terminal of a second comparator;
a threshold setting module with an output terminal coupled to an input terminal of a second subtracter and coupled to an inverting terminal of a second comparator;
a first subtracter with the feedback signal as an input, an output coupled to a non-inverting terminal of a first comparator;
a second subtracter with an input terminal coupled to an output terminal of the threshold setting module, an output terminal coupled to the high frequency pulse signal generator to provide the control signal;
a first comparator with a non-inverting terminal coupled to the output terminal of the first subtracter, an inverting terminal coupled to the output terminal of the frequency setting module for the low frequency modulation signal, outputting the low frequency modulation signal;
a second comparator with an inverting terminal coupled to the output terminal of the threshold setting module, a non-inverting terminal coupled to the output terminal of the frequency setting module for the low frequency modulation signal, and an output terminal coupled to the frequency setting module.

13. The switching mode power supply of claim 3 wherein the control signal is coupled to the high frequency pulse signal generator to control the frequency of the high frequency pulse signal.

14. The switching mode power supply of claim 3 wherein the high frequency pulse signal generator comprises:
a frequency setting module for the high frequency pulse signal;
a third comparator with a non-inverting terminal coupled to the frequency setting module, outputting a reset signal;
a circuit selecting module with the feedback signal and the control signal from the burst-mode controller as inputs, with an output terminal coupled to the inverting terminal of the third comparator;
a flip-flop, with a SET terminal coupled to the output terminal of the third comparator, a RESET terminal receiving the current detecting signal and outputting the high frequency pulse signal.

15. The switching mode power supply of claim 2 wherein the high frequency pulse signal generator comprises:
a circuit selecting module, receiving the feedback signal and the control signal from the burst-mode controller, generating an output signal to the current detecting module;
a SET circuit, outputting a SET signal; and
a flip-flop having a SET terminal receiving the SET signal, a RESET terminal receiving the current detecting signal, and outputting the high frequency pulse signal.

16. The switching mode power supply of claim 15 wherein if a peak current pulse width modulation (PWM) control mode is used for the normal load condition, the SET circuit is a clock signal generator.

17. The switching mode power supply of claim 15 wherein if a quasi-resonant control mode is used for the normal load condition, the SET circuit is a valley detecting module.

18. The switching mode power supply of claim 15 wherein the control signal is selected by the circuit selecting module to control the on-time of the switch under the light load condition, and the feedback signal is selected by the circuit selecting module to control the on-time of the switch under the normal load condition.

19. A method for controlling a switching mode power supply, comprising:
generating a feedback signal based on a load condition;
comparing the value of the feedback signal with a threshold value to indicate a light load condition or a normal load condition, wherein the switching mode power supply operates in a burst mode for the light load condition;
detecting the current flowing through a switch to generate a current detecting signal;
generating a low frequency modulation signal based on the feedback signal, wherein the frequency of the low frequency modulation signal is fixed;
generating a high frequency pulse signal based on the feedback signal and the current detecting signal; and
generating a switch controlling signal to control the switch based on the low frequency modulation signal and the high frequency pulse signal.

20. The method of claim 19 wherein under the light load condition, the method further comprises:
setting the frequency of a high frequency pulse signal to be within a predetermined range; and
adjusting the duty cycle of the low frequency modulation signal to control the power supplied to the load.

21. The method of claim 19 wherein the high frequency pulse signal is determined by a control signal and the current detecting signal under the light load condition, and the high frequency pulse signal is determined by the feedback signal and the current detecting signal under the normal load condition.

22. The method of claim 21 wherein when the load is in a normal load condition, a pulse width modulation (PWM) control mode is used.

23. The method of claim 21 wherein when the load is in a normal load condition, a quasi resonant control mode is used.

24. The method of claim 21 wherein when the load is in a normal load condition, a fixed on-time variable off-time control mode is used.

25. The method of claim 20 wherein the frequency of the high frequency pulse signal is larger than a upper limit of an excluded frequency range.

26. The method of claim 20 wherein the frequency of the low frequency modulation signal is lower than a lower limit of an excluded frequency range.

27. The method of claim 25 or 26 wherein the excluded frequency range covers an audible frequency range.

28. The method of claim 21 wherein the threshold value is used to set the frequency of the low frequency modulation signal, the value of the feedback signal is used to control the duty cycle of the low frequency modulation signal, the frequency of the high frequency pulse signal is controlled by the value of the feedback signal or by the threshold value.

29. The method of claim 28 wherein the frequency and the duty cycle of the low frequency modulation signal is controlled by:
- setting the frequency setting module for the low frequency modulation signal;
- comparing the output signal of the frequency setting module with the threshold value to generate a saw-tooth waveform signal;
- the first comparator comparing the saw-tooth waveform signal with a signal based on the value of the feedback signal, outputting a low frequency modulation signal with its frequency and duty cycle controlled.

30. The method of claim 28 wherein the controlling to the frequency of the high frequency pulse signal is realized by:
- setting the frequency setting module for the high frequency pulse signal, the frequency setting module includes at least one capacitor; an output signal from the frequency setting module is compared with the feedback signal or with a signal based on the threshold value by a third comparator;
- the output signal of the third comparator is coupled to the SET terminal of a flip-flop and the output signal of the flip-flop is coupled to the frequency setting module to control discharging of the at least one capacitor.

* * * * *